(12) United States Patent
Ramos

(10) Patent No.: US 9,341,175 B2
(45) Date of Patent: May 17, 2016

(54) PUMP SEAL

(75) Inventor: Rolando Nico M. Ramos, Singer Island, FL (US)

(73) Assignee: LOBEPRO, INC., Brunswick, GA (US)

( * ) Notice: Subject to any disclaimer, the term of this patent is extended or adjusted under 35 U.S.C. 154(b) by 0 days.

(21) Appl. No.: 13/817,878

(22) PCT Filed: Aug. 17, 2011

(86) PCT No.: PCT/US2011/048080
§ 371 (c)(1),
(2), (4) Date: May 2, 2013

(87) PCT Pub. No.: WO2012/024398
PCT Pub. Date: Feb. 23, 2012

(65) Prior Publication Data
US 2013/0209295 A1    Aug. 15, 2013

Related U.S. Application Data

(60) Provisional application No. 61/344,559, filed on Aug. 20, 2010.

(51) Int. Cl.
*F03C 2/00* (2006.01)
*F04B 39/04* (2006.01)
(Continued)

(52) U.S. Cl.
CPC .............. *F04B 39/04* (2013.01); *F04D 29/106* (2013.01); *F16J 15/344* (2013.01); *Y10T 29/49238* (2015.01)

(58) Field of Classification Search
CPC ....... F04D 29/106; F04B 39/04; F16J 15/344; F16J 15/34; F16J 15/3436
USPC .................. 417/437; 277/345, 352, 370, 500; 29/888.021
See application file for complete search history.

(56) References Cited

U.S. PATENT DOCUMENTS 2,859,988 A * 11/1958 Payne ........................... 277/393
2,863,680 A * 12/1958 Taltavall, Jr. .......... F04D 29/126
                                                              277/352

(Continued)

FOREIGN PATENT DOCUMENTS

CN          1167877 A      12/1997
CN        101713461 A       5/2010
WO     WO 2012/024398 A1    2/2012

OTHER PUBLICATIONS

International Search Report and Written Opinion issued Jan. 26, 2012, in International PCT Application No. PCT/US2011/048080, filed Aug. 17, 2011.

(Continued)

*Primary Examiner* — Jesse Bogue
*Assistant Examiner* — Jason T Newton
(74) *Attorney, Agent, or Firm* — Finnegan, Henderson, Farabow, garrett & Dunner, L.L.P.

(57) ABSTRACT

A seal for a pump includes a seal housing configured to be received in a housing of the pump and a seal assembly received in the seal housing. The seal further includes a seal holder receiving at least a portion of the seal assembly, the seal holder being configured to rotate with respect to the seal housing. The seal also includes a guide coupled to the seal housing and retaining the seal holder, such that the seal holder rotates with respect to the seal housing, wherein during operation of the pump, the seal holder and a portion of the seal assembly rotate. A pump includes the pump seal, and a method for refurbishing a pump seal includes removing and replacing at least a portion of a seal assembly of the pump seal, wherein refurbishing the pump seal does not require removing a pump shaft from the pump.

16 Claims, 5 Drawing Sheets

(51) Int. Cl.
*F04D 29/10* (2006.01)
*F16J 15/34* (2006.01)

(56) References Cited

U.S. PATENT DOCUMENTS

| | | | | |
|---|---|---|---|---|
| 3,169,775 A * | 2/1965 | Macaluso | F16J 15/34 | 277/362 |
| 3,235,274 A * | 2/1966 | Cain, Jr. et al. | | 277/500 |
| 3,306,223 A * | 2/1967 | Liebig | | 277/353 |
| 3,367,274 A * | 2/1968 | Lombard | | 415/124.2 |
| 3,511,513 A * | 5/1970 | Dahlheimer | | 277/353 |
| 3,554,559 A * | 1/1971 | Dahlheimer | | 277/348 |
| 3,905,607 A * | 9/1975 | Maguire | F16J 15/344 | 277/382 |
| 3,985,366 A * | 10/1976 | Plouzek | F16J 15/344 | 277/367 |
| 4,077,634 A * | 3/1978 | Durham | F16J 15/344 | 277/382 |
| 4,105,214 A * | 8/1978 | Schexnayder | F16J 15/344 | 277/364 |
| 4,256,315 A * | 3/1981 | Larson | F16J 15/344 | 277/381 |
| 4,406,462 A * | 9/1983 | Witten | | 277/348 |
| 4,421,327 A * | 12/1983 | Morley | F16J 15/344 | 277/381 |
| 4,436,315 A * | 3/1984 | Hatch | F16J 15/344 | 277/370 |
| 4,815,747 A * | 3/1989 | Wolford | | 277/306 |
| 4,844,483 A * | 7/1989 | Iijima | F16J 15/162 | 277/382 |
| 5,983,779 A | 11/1999 | Romanco | | |
| 6,047,969 A * | 4/2000 | Hoefft | F16J 15/344 | 277/370 |
| 6,213,471 B1 * | 4/2001 | Anderson | F16J 15/344 | 277/370 |
| 7,108,266 B2 * | 9/2006 | Dahlheimer | F16J 15/3404 | 277/409 |
| 2002/0163133 A1* | 11/2002 | Bedford | F16J 15/344 | 277/309 |
| 2004/0227298 A1* | 11/2004 | Azibert | | 277/370 |
| 2009/0304540 A1* | 12/2009 | Whittome et al. | | 418/104 |
| 2010/0090412 A1* | 4/2010 | Scott et al. | | 277/375 |
| 2010/0150764 A1* | 6/2010 | Simonelli et al. | | 418/191 |
| 2012/0161500 A1* | 6/2012 | Vik | F16J 15/344 | 301/105.1 |

OTHER PUBLICATIONS

Second Office Action issued Jun. 3, 2015, in counterpart Chinese Patent Application No. 201180049959.9.

* cited by examiner

PUMP SEAL

CLAIM OF PRIORITY

This application is a U.S. national stage entry under 35 U.S.C. §371 from PCT International Application No. PCT/US2011/048080, filed Aug. 17, 2011, which claims priority to and the benefit of the filing date of U.S. Provisional Application No. 61/344,559, filed Aug. 20, 2010, the subject matter of all of which is incorporated herein by reference.

FIELD OF THE DESCRIPTION

The present description relates to a seal, and in particular, to a seal for a pump.

BACKGROUND

Pumps come in many forms, including, for example, rotodynamic pumps, sometimes referred to as "centrifugal pumps," and positive-displacement pumps. Some positive-displacement pumps include one or more pistons configured to displace materials including fluid such as air, liquid, and/or materials including a combination of fluid, semi-solid materials, and solid materials. For example, a positive-displacement, rotary pump may include one or more circumferential pistons or lobes (together hereinafter referred to as "pistons") for pumping material. The pistons are coupled to a driven shaft such that during operation, the pistons rotate in a plane substantially perpendicular to the shaft. The shaft may be mounted in a cantilever manner and extending from a bearing assembly. In order to prevent the bearing assembly and other internals of the pump from being exposed to the material being pumped, a seal may be provided between the pistons and the bearing assembly.

Some seals may suffer from a number of drawbacks. For example, after extended use of the pump, it may be desirable to replace or refurbish the seal. However, removal from the shaft of some seals may require removal of the shaft from the pump, resulting in increased difficulty replacing or refurbishing the seal and increasing lost operation time of the pump. In addition, for some seals, it may not be possible to refurbish the seal without removing the entire pump shaft.

Thus, it may be desirable to provide a pump seal that mitigates or solves one or more of the above-noted drawbacks.

SUMMARY

In accordance with one aspect of the disclosure, a seal for a pump includes a seal housing configured to be received in a housing of the pump and a seal assembly received in the seal housing. The seal further includes a seal holder receiving at least a portion of the seal assembly, the seal holder being configured to rotate with respect to the seal housing. The seal also includes a guide coupled to the seal housing and retaining the seal holder, such that the seal holder rotates with respect to the seal housing, wherein during operation of the pump, the seal holder and a portion of the seal assembly rotate.

According to a further aspect, a pump includes a pump housing defining a pump inlet, a pump outlet, and a pump chamber providing flow communication between the pump inlet and the pump outlet. The pump further includes a pump shaft rotatably coupled to the pump housing, at least one pump piston coupled to the shaft, such that the pump piston rotates within the pump chamber, and a pump bearing associated with the pump shaft and the pump housing and configured to allow rotation of the pump shaft relative to the pump housing. The pump further includes a seal associated with the pump shaft and the pump housing, such that the pump chamber is substantially sealed from the pump bearing. The seal includes a seal housing received in the pump housing, a seal assembly received in the seal housing, and a seal holder receiving at least a portion of the seal assembly, the seal holder being configured to rotate with respect to the seal housing. The seal further includes a guide coupled to the seal housing and retaining the seal holder, such that the seal holder rotates with respect to the seal housing, wherein during operation of the pump, the seal holder and a portion of the seal assembly rotate.

According to still another aspect, a method of refurbishing a pump seal includes removing a pump piston from a pump shaft of the pump, removing a guide from the pump seal, and removing a seal holder from the pump seal. The method further includes removing at least a portion of a seal assembly from the pump seal housing, and replacing the at least a portion with a new or refurbished portion, wherein refurbishing the seal does not require removing the pump shaft from the pump.

Additional objects and advantages of the disclosed exemplary embodiments will be set forth in part in the description which follows, or may be learned by practice of the disclosed embodiments.

Aside from the structural and procedural arrangements set forth above, the disclosed exemplary embodiments could include a number of other arrangements, such as those explained hereinafter. It is to be understood that both the foregoing description and the following description are exemplary only.

DESCRIPTION OF EXEMPLARY EMBODIMENTS

Figure 1:
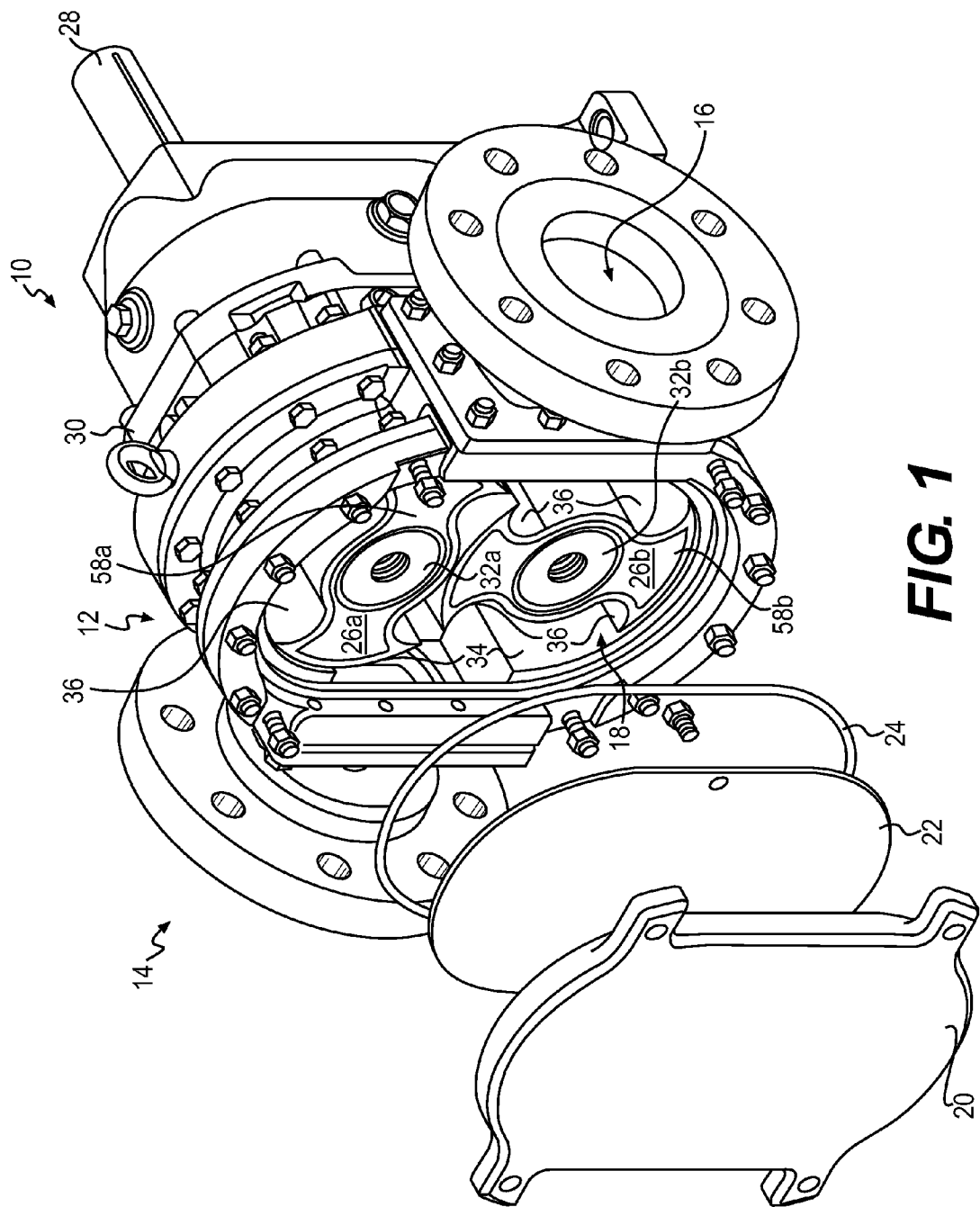
FIG. 1 is a perspective assembly view of an exemplary embodiment of a positive-displacement, rotary pump.

Reference will now be made in detail to exemplary embodiments. Wherever possible, the same reference numbers are used in the drawings and the description to refer to the same or like parts.

FIG. 1 shows an exemplary embodiment of a pump 10 for pumping material, including liquid, semi-solids, solids, and/or a combination thereof. Exemplary pump 10 is a positive-displacement, rotary pump and includes a housing 12 having an inlet 14 for receiving a material being pumped, an outlet 16 for expelling the pumped material, and a chamber 18 providing flow communication between inlet 14 and outlet 16. One end of exemplary chamber 18 is closed via a housing plate 20 and a chamber plate 22, with a gasket or seal 24 sealing the end of chamber 18.

As shown in FIG. 1, exemplary pump 10 includes two circumferential pistons 26a and 26b configured to rotate within chamber 18 along respective axes substantially perpendicular to a path of the material being pumped. Although exemplary pump 10 includes two pistons 26a and 26b, fewer or more pistons are contemplated. In addition, although exemplary pistons 26a and 26b shown in FIG. 1 include two opposing lobes, it is contemplated that pistons 26a and 26b may include more than two opposing lobes, such as, for example, three, four, or five opposing lobes.

As shown in FIG. 1, exemplary pump 10 also includes an input shaft 28 configured to be coupled to a prime mover (not shown), such as, for example, an engine or motor, Input shaft 28 drives a gearbox assembly 30 coupled to two piston shafts 32a and 32b on which pistons 26a and 26b are respectively mounted (see FIG. 1), such that pistons 26a and 26b are driven at the same rotational speed in opposite directions.

In the exemplary embodiment shown, as pistons 26a and 26b rotate within chamber 18, suction is created between respective outer surfaces of pistons 26a and 26b and inner surfaces 34 of chamber 18, thereby pulling material into inlet 14. The outer surfaces of pistons 26a and 26b and inner surfaces 34 of chamber 18 may have substantially complimentary radii, resulting in an ability to create greater suction for pulling material into housing inlet 14 due to a relatively large overlapping area between the outer surfaces of pistons 26a and 26b and inner surfaces 34 of chamber 18. For example, pump 10 may be able to develop 100 pounds per square inch or more pressure. In the exemplary embodiment shown in FIG. 1, pistons 26a and 26b include concave lobe portions 36, which operate as scoops to convey material entering via inlet 14 to outlet 16, thereby potentially being able to pump materials having solids of 0.75 inch or more in the material.

Figure 2:
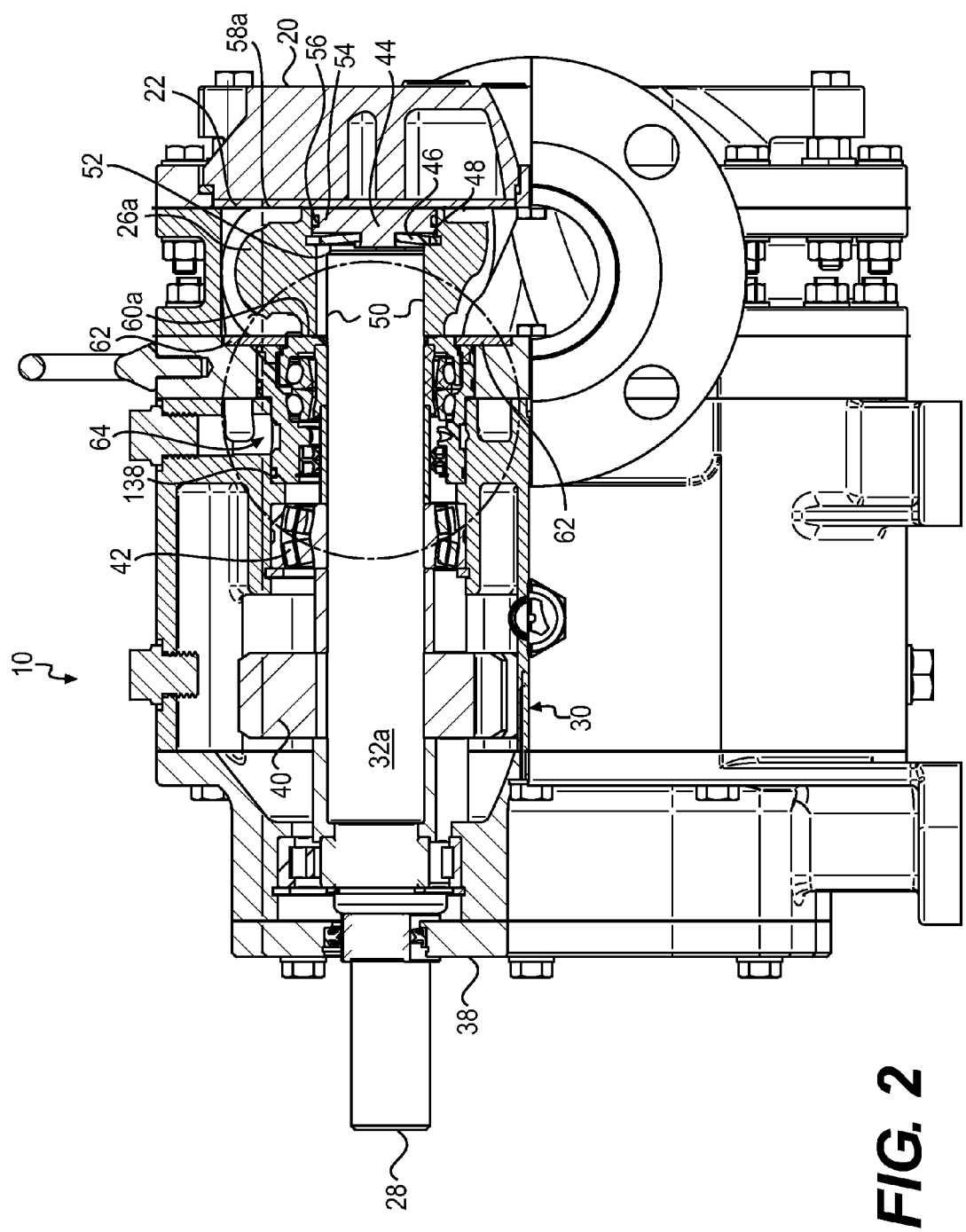
FIG. 2 is a partial section view of an exemplary embodiment of a positive-displacement, rotary pump.

Referring to FIG. 2, input shaft 28 extends through an end wall 38 of housing 12, extends into gearbox assembly 30, and is coupled to a spur gear (not shown). The spur gear engages one or more spur gear(s) 40, which is/are coupled to piston shafts 32a and 32b. Piston shafts 32a and 32b each extend through a bearing 42, which rotatably supports the respective piston shafts 32a and 32b. (In FIG. 2, only piston shaft 32a and its associated bearing 42 is visible.) Piston shafts 32a and 32b extend from respective bearings 42 to chamber 18 of housing 12, where pistons 26a and 26b are mounted on respective ends of piston shafts 32a and 32b. A fastener 44 secures each respective piston 26a and 26b to each respective piston shaft 32a and 32b.

According to some embodiments, each of fasteners 44 includes a threaded shaft (not shown), which engages a threaded bore in the end of piston shafts 32a and 32b (see FIG. 1), with a retainer ring 46 extending into a circumferential groove 48 in an inner diameter of a bore 50 in pistons 32a and 32b. Bore 50 includes a keyway (not shown), which receives a key 52 for preventing pistons 26a and 26b from rotating relative to respective piston shafts 32a and 32b. In the exemplary embodiment shown, fasteners 44 include a circular flange 54, which presses against retainer 46 and fits into a counter bore in pistons 26a and 26b. As shown, flange 54 may also include a groove on the outer diametrical portion thereof, which receives an o-ring 56 for providing a seal preventing ingress of undesirable material (e.g., the material being pumped by pump 10) between the counter bore of pistons 26a and 26b and flange 54 of fasteners 44.

As shown in FIG. 2, an external end of flange 54 and remote faces 58a and 58b of respective pistons 26a and 26b (see also FIG. 1) abut and rotate against (or in close proximity thereto) chamber plate 22, and proximal faces 60a and 60b of pistons 26a and 26b abut and rotate against (or in close proximity thereto) a wear plate 62. This exemplary arrangement facilitates creation of suction in chamber 18 during operation of exemplary pump 10.

Figure 3:
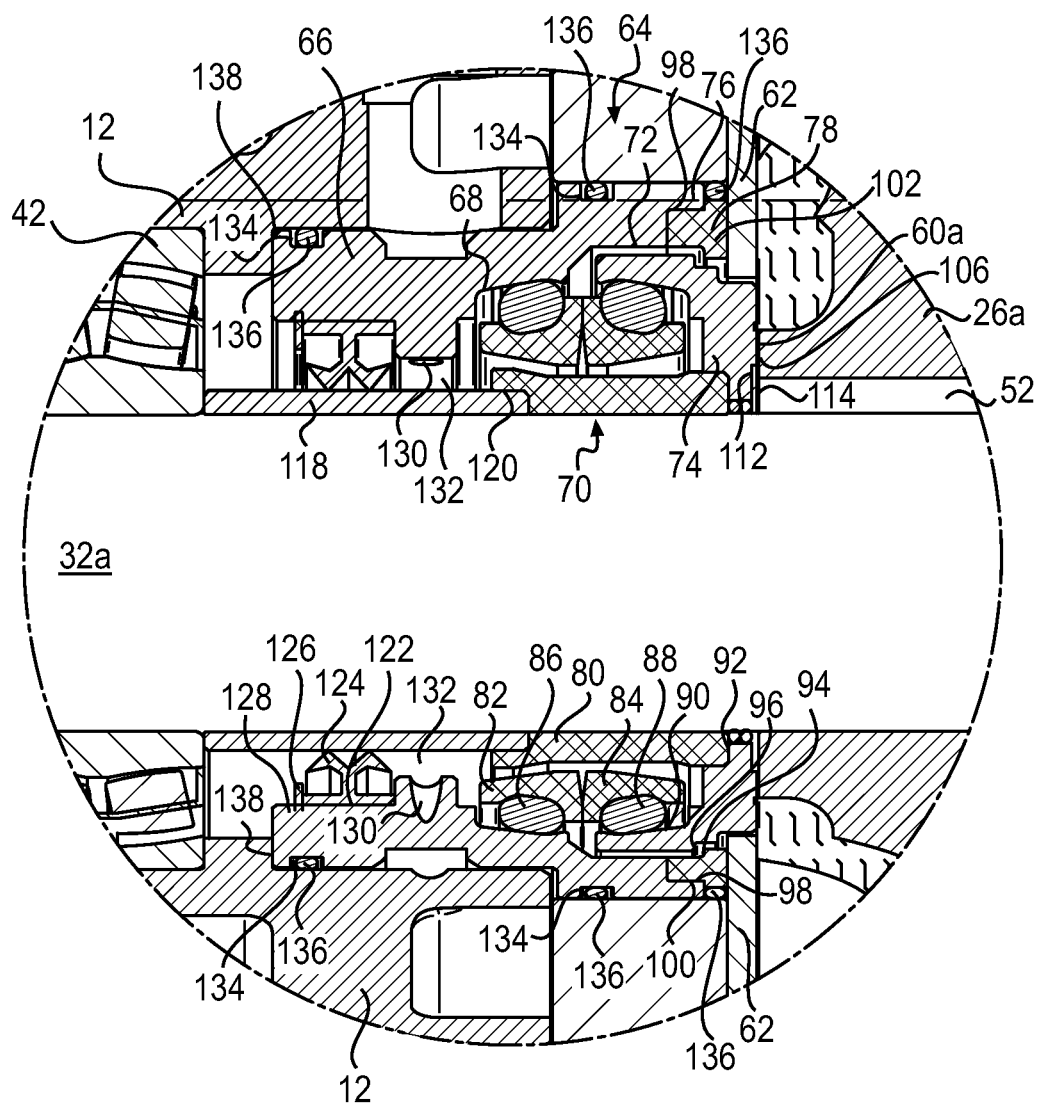
FIG. 3 is a detail section view of the exemplary embodiment of pump shown in FIG. 2, showing an exemplary embodiment of a pump seal installed in the pump.

As shown in FIGS. 2 and 3, exemplary pump 10 also includes a pump seal 64 for each piston shaft 32a and 32b. Exemplary pump seal 64 provides a seal preventing ingress of undesirable material (e.g., the material being pumped by pump 10) from chamber 18 to bearings 42 and/or into gearbox assembly 30 of housing. As shown in FIG. 2, each exemplary pump seal 64 is sandwiched between a respective piston 26a and 26b and a respective bearing 42, with respective fasteners 44 providing a tightening, longitudinal force urging proximal faces 60a and 60b of pistons 26a and 26b against wear plate 62. Although FIGS. 2 and 3 may appear to show pump seal 64 coupled directly to piston shaft 32a, according to some embodiments, pump seal 64 is not directly coupled to piston shaft 32a (e.g., as explained in more detail below, piston shaft 32a extends through pump seal 64 without contacting a substantial portion of pump seal 64). According to some alternative embodiments, substantial portions of pump seal 64 may be driven directly by piston shaft 32a.

Figure 4:
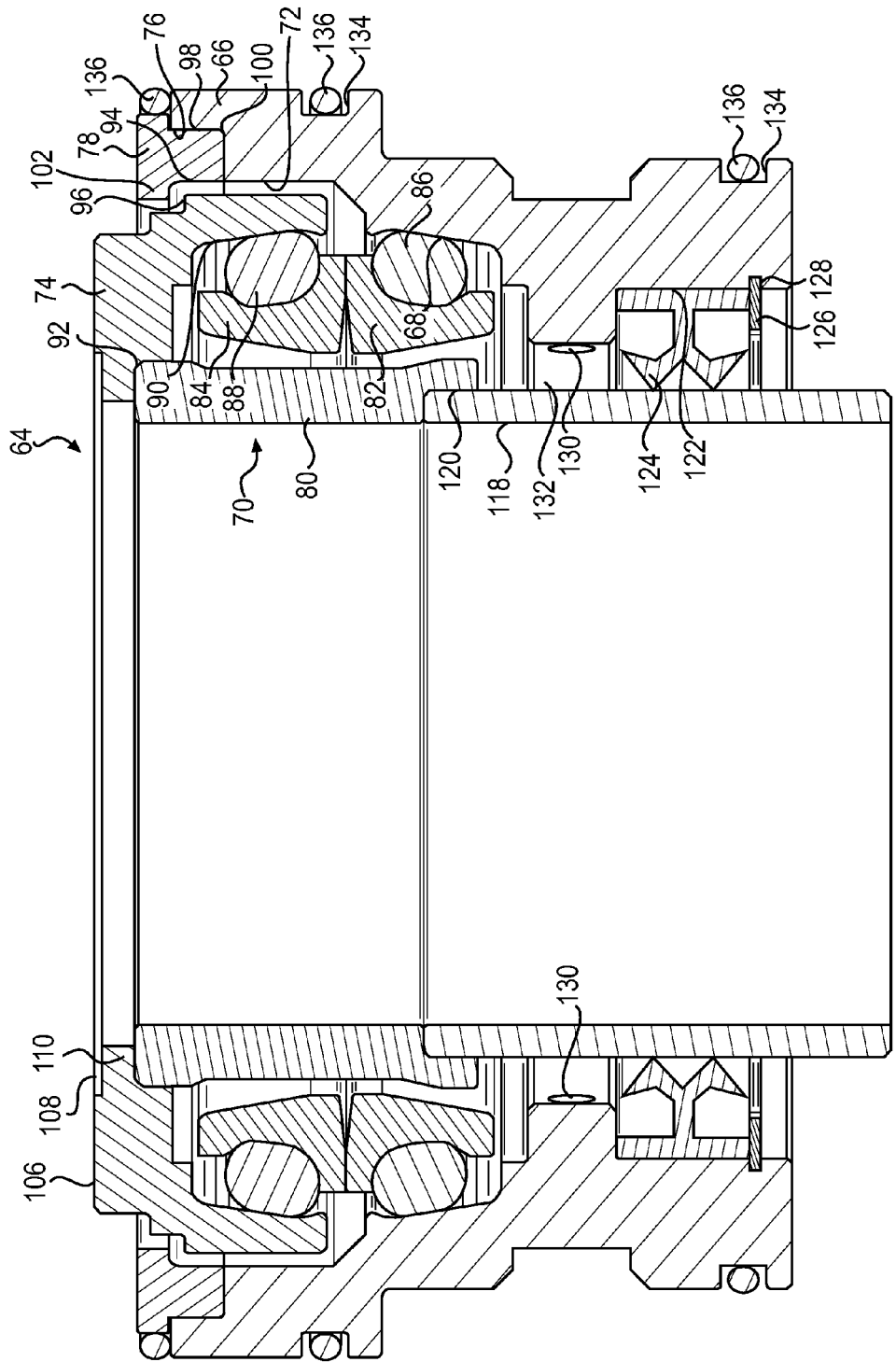
FIG. 4 is a section view of an exemplary embodiment of a pump seal.

As shown in FIGS. 3 and 4, exemplary pump seal 64 includes a seal housing 66 received in housing 12 of pump 10. Exemplary seal housing 66 includes outer and inner annular surfaces, with the outer annular surface defining an outer profile for being received in housing 12 of pump 10, and the inner annular surface defining an inner profile for receiving components of pump seal 64. For example, the inner profile includes an annular recess 68 configured to at least partially receive a seal assembly 70, an annular recess 72 configured to at least partially receive a seal holder 74, and an annular recess 76 configured to receive a guide 78. In the exemplary embodiment shown, annular recess 76 has a larger diameter than annular recess 72, which, in turn, has a larger diameter than annular recess 68.

In the exemplary embodiment shown in FIGS. 3 and 4, seal assembly 70 includes a seal spacer 80 with a stationary seal 82 and a rotating seal 84 positioned around seal spacer 80. Exemplary seal assembly 70 also includes an o-ring 86 extending around an outside diameter of stationary seal 82 and an o-ring 88 extending around an outside diameter of rotating seal 84. When installed in seal housing 66, o-ring 86 associated with stationary seal 82 is at least partially compressed against annular recess 68 of seal housing 66, thereby providing a seal between rotating seal and the opposite side of stationary seal 82. Stationary seal 82 and associated o-ring 86 are not intended to rotate during operation of pump 10.

Exemplary rotating seal 84 abuts against stationary seal 82, and seal holder 74 includes an annular recess 90 receiving rotating seal 84 and associated o-ring 88. Exemplary seal holder 74 also includes a recess 92 receiving an end of seal spacer 80. When installed in seal housing 66, o-ring 88 associated with rotating seal 84 is at least partially compressed against annular recess 90 of seal holder 74, with recess 92 of seal holder receiving and abutting against the end of seal spacer 80, thereby providing a seal between opposite sides of rotating seal 84. During operation of pump 10, rotating seal 84, associated o-ring 88, and seal holder 74 are intended to rotate. Thus, stationary seal 82 and rotating seal 84 are face seals, with adjacent surfaces of stationary seal 82 and rotating seal 84 sliding against one another as rotating seal 84 rotates and stationary seal 82 remains substantially fixed against rotation.

In the exemplary embodiment shown in FIGS. 3 and 4, exemplary guide 78 retains seal holder 74 in position such that o-ring 88 is at least partially compressed, with clearance provided to permit rotation of seal holder 74. Guide 78 includes an annular recess 94 receiving a shoulder 96 of seal holder 74 when installed in seal housing 66. According to some embodiments, annular recess 76 of seal housing 66 and an outer diameter 98 of guide 78 may be dimensioned to provide a press-fit engagement between seal housing 66 and guide 78. Exemplary guide 78 includes a shoulder 100 for abutting an end of annular recess 76 of seal housing 66, such that when guide 78 and seal housing 66 are coupled to one another, shoulder 100 abuts the end of annular recess 76.

In the exemplary embodiment shown, guide 78 includes an inwardly-extending annular flange 102. When guide 78 is installed in seal housing 66, annular flange 102 permits seal holder 74 to rotate with respect to seal housing 66, with guide 78 remaining stationary with seal housing 66. Annular flange 102 also assists with retaining seal holder 74 in its installed position in seal housing 66. For example, when exemplary pump seal 64 is not installed, guide 78 may serve to retain seal holder 74 and seal assembly 70, including stationary seal 82, o-ring 86, rotating seal 84, o-ring 88, and seal spacer 80 in seal housing 66.

As shown in FIG. 4, exemplary seal holder 74 includes an end face 106 defining at an inner diameter thereof and an annular face recess 108. Seal holder 74 also defines an inwardly-extending flange 110 having an inner diameter slightly larger than an inner diameter defined by an end of seal spacer 80. According to the exemplary embodiments shown, when pump seal 64 is installed in pump 10, piston shaft 32a extends through seal spacer 80. According to some embodiments, seal spacer 80 does not contact piston shaft 32a. Rather, a slight annular space is provide between piston shaft 32a and seal spacer 80. As shown in FIG. 3, one or more o-rings 112 may be provided around piston shaft 32a, such that they are positioned between piston shaft 32a and the inner diameter of flange 110 of seal holder 74. In addition, a washer 114 may be received in face recess 108 of seal holder 74, which serves to maintain the longitudinal position of the one or more o-rings 112 on piston shaft 32a. O-rings 112 are in direct contact with piston shaft 32a and provide a seal between seal spacer 80 and the opposite side of the one or more o-rings 112. Thus, the one or more o-rings 112 may be driven directly by rotation of piston shaft 32a. In contrast, seal holder 74, seal spacer 80, and rotating seal 84 are rotated by piston 26a, which is pressed against end face 106 of seal holder 80. According to some alternative embodiments, seal spacer 80 may define an inner diameter dimensioned to be directly driven by rotation of piston shaft 32a.

According to some embodiments, annular recess 72 of seal housing 66 and outer diameter 98 of guide 78 may each include a threaded portion (not shown), and engagement between seal housing 66 and guide 78 may be obtained via threaded engagement between the threaded portions. According to the exemplary embodiment shown in FIG. 5, guide 78 may be coupled to seal housing 66 via one or more fasteners, such as, for example, fasteners 116.

As shown in FIGS. 3 and 4, exemplary pump seals 64 include a sleeve 118 configured to abut an end of seal spacer 80 opposite from seal holder 74. For example, in the exemplary embodiment shown, seal spacer 80 includes an inner annular recess 120, which receives an end of sleeve 118. As shown in FIG. 3, when installed in pump 10, sleeve 118 extends between seal spacer 80 and bearing 42. Thus, by virtue of piston 26a pressing longitudinally against end face 106 of seal holder 74, which presses against seal spacer 80, which presses against sleeve 118, sleeve 118 is sandwiched between seal pacer 80 and bearing 42. According to some embodiments, the inner diameter of sleeve 118 is slightly larger than the diameter of piston shaft 32a, and thus, during operation of pump 10, piston shaft 32a does not drive rotation of sleeve 118. Rather, rotation of sleeve 118 is driven by rotation of seal spacer 80 and seal holder 74 as piston 26a rotates and presses against end face 106 of seal holder 74. According to some alternative embodiments, the inner diameter of sleeve 118 may be dimensioned to be directly driven by rotation of piston shaft 32a.

At the opposite end of seal housing 66 from seal holder 74, seal housing 66 defines an inner annular recess 122. In the exemplary embodiment shown in FIGS. 3-5, recess 122 receives a lip seal 124, which is retained in recess 122 by a retainer, such as a retaining ring 126, which receive in an annular groove 128 in recess 122. In the exemplary embodiment shown, lip seal 124 is a dual lip seal. Lip seal 124, like seal housing 66 in which it is mounted, is not intended to rotate during operation of pump 10.

Exemplary seal housing 66 includes one or more lubricant ports 130 providing flow communication between housing 12 of pump 10 and sleeve 118. As shown, lubricant ports 130 are arranged radially about seal housing 66 and are located between stationary seal 82 and lip seal 124. Lubricant ports 130 permit lubricant to flow from housing 12 into an annular space 132 adjacent lip seal 124, with the lubricant providing reduced friction between lip seal 124 and sleeve 118 as sleeve 118 rotates within lip seal 124, which remains stationary. According to some embodiments, an annular port cover (e.g., a plastic ring) (not shown) may be provided around seal housing 66 at the location of lubricant ports 130 during shipping and/or prior to installation of pump seal 64 to prevent dirt or other undesirable matter from entering lubricant ports 130 and entering annular space 132. Prior to installation of seal housing 66 in a pump, the annular port cover may be removed to permit lubricant ports 130 to provide flow communication to annular space 132.

Figure 5:
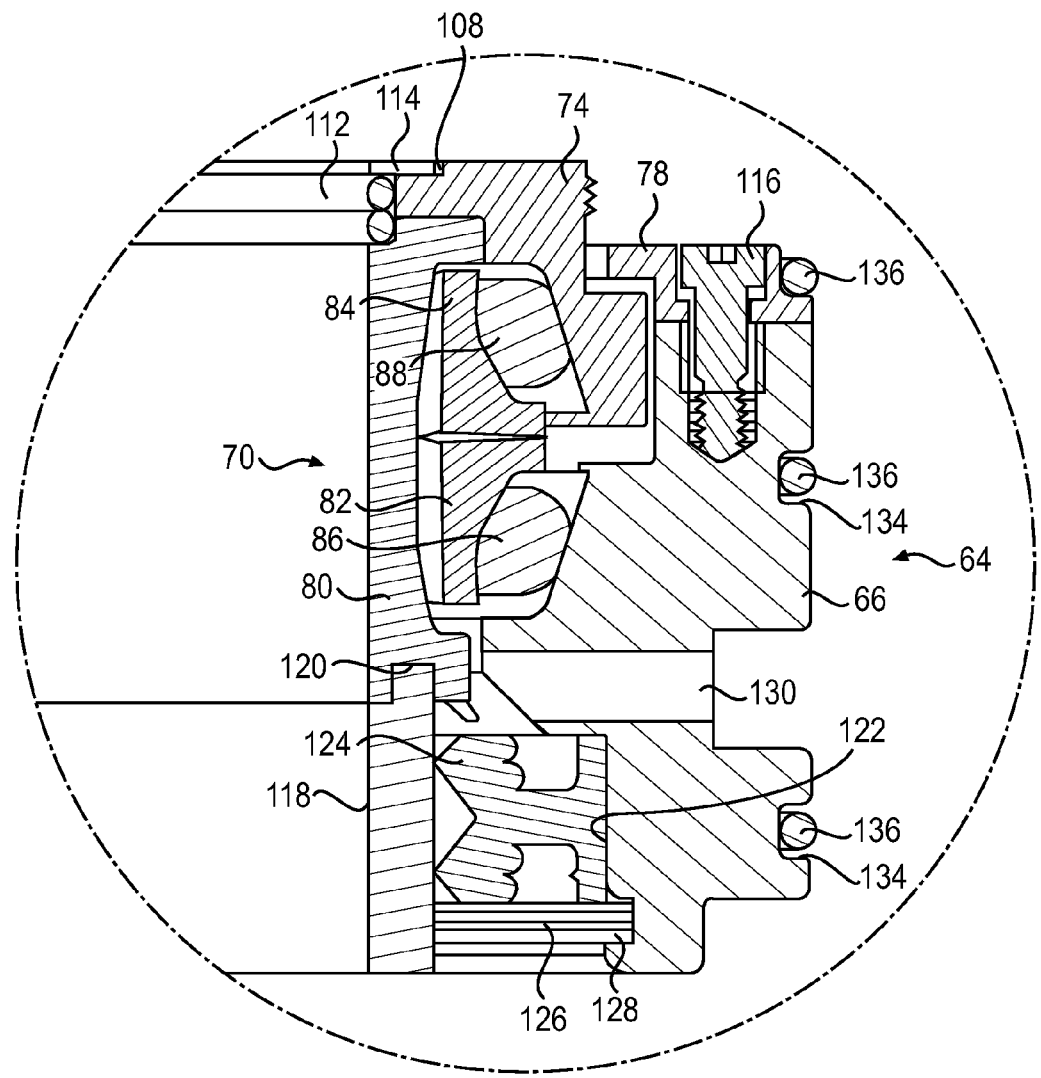
FIG. 5 is a section view of another exemplary embodiment of a pump seal.

As shown in FIGS. 3-5, seal housing 66 may include a number of annular grooves 134 located at the outer annular surface of seal housing 66. Annular grooves 134 receive o-rings 136, which provide a seal between seal housing 66 and housing 12 of pump 10. In the exemplary embodiment shown, an o-ring 136 may also be provided around the outer diameter of guide 78 to provide a seal between guide 78 and housing 12 of pump 10.

Exemplary pump seals 64 shown in FIGS. 3-5 may provide advantages when being installed, replaced, and/or refurbished. For example, when installing pump seals 64, with housing plate 20, chamber plate 22, and one or more of pistons 32a and 32b removed, exemplary pump seal 64 may be slid down piston shaft 32a as a unitary piece until sleeve 118 abuts bearing 42 and/or until an end of seal housing 66 abuts an end of an annular recess 138 of housing 12 of pump 10. Thereafter, the one or more o-rings 112 can be installed on piston shaft 32a, and washer 114 may be placed over piston shaft 32a and into face recess 108 of seal holder 74. Thereafter, piston 26a can be mounted on piston shaft 32a and tightened onto piston shaft 32a via fastener 44 (see FIG. 2), which may be tightened according to a predetermined tightening torque. Chamber plate 22 and housing plate 20 may thereafter be installed (see FIG. 1).

Conversely, when removing exemplary pump seal 64, housing plate 20, chamber plate 22, and piston 32a are removed, and pump seal 64 may be pulled off piston shaft 32a as a unitary piece. When refurbishing exemplary pump seal 64, for example, when replacing one or more portions of seal assembly 70, with housing plate 20, chamber plate 22, and piston 32a removed, and without removing the entire pump seal 64 from housing 12 of pump 10, guide 78 may be removed from seal housing 66 (e.g., by, depending on type of engagement, overcoming the press-fit engagement between guide 78 and seal housing 66, unscrewing guide 78 from seal housing 66, or removing fasteners 116 (FIG. 5)). Thereafter, seal holder 74 may be pulled off piston shaft 32a to provide access to seal assembly 70, and one or more portions of seal assembly 70 may be removed and replaced with different portions (e.g., new or refurbished portions). For example, one or more of stationary seal 82, o-ring 86, rotating seal 84, o-ring 88, and seal spacer 80 may be removed and replaced, for example, without removing seal housing 66 from housing 12 of pump 10, or without removing piston shaft 32a from pump 10.

At least some portions of exemplary embodiments outlined above may used in association with portions of other exemplary embodiments. Moreover, at least some of the exemplary embodiments disclosed herein may be used independently from one another and/or in combination with one another and may have applications to pumps not disclosed herein.

It will be apparent to those skilled in the art that various modifications and variations can be made to the structures and methodologies described herein. Thus, it should be understood that the invention is not limited to the subject matter discussed in the description. Rather, the invention is intended to cover modifications and variations.

What is claimed is:

1. A seal for a pump, the seal comprising:
   a seal housing configured to be received in a housing of the pump;
   a seal assembly received in the seal housing, the seal assembly comprising a seal spacer, a rotating seal, and a stationary seal;
   a seal holder receiving at least a portion of the seal assembly, the seal holder being configured to rotate with respect to the seal housing;
   a guide coupled to the seal housing and retaining the seal holder, such that the seal holder rotates with respect to the seal housing; and
   a sleeve abutting the seal spacer, wherein the seal holder, seal spacer, and sleeve are configured to extend around a shaft of the pump and between a piston of the pump and a bearing of the pump,
   wherein the rotating seal and the stationary seal are positioned around the seal spacer, and wherein the rotating seal and the stationary seal comprise a rotating face seal and a stationary face seal, respectively, and
   wherein the seal holder abuts the seal spacer and rotates with the seal spacer and the rotating seal, and during operation of the pump, the seal holder and at least a portion of the seal assembly rotate.

2. The seal of claim 1, further comprising a lip seal and a retainer coupling the lip seal to the seal housing, wherein the sleeve rotates within the lip seal.

3. The seal of claim 1, wherein the seal housing comprises a lubricant port configured to provide flow communication between the housing of the pump and the sleeve.

4. The seal of claim 1, further comprising:
   at least one o-ring configured to abut the seal holder and to be located between the seal holder and a shaft of the pump; and
   a washer configured to abut the seal holder and retain the at least one 0-ring between the seal holder and the shaft of the pump.

5. The seal of claim 1, further comprising at least one o-ring associated with the seal housing and configured to provide a seal between the seal housing and the housing of the pump.

6. A pump comprising:
   a pump housing defining a pump inlet, a pump outlet, and a pump chamber providing flow communication between the pump inlet and the pump outlet;
   a pump shaft rotatably coupled to the pump housing;
   at least one pump piston coupled to the shaft, such that the pump piston rotates within the pump chamber;
   a pump bearing associated with the pump shaft and the pump housing and configured to allow rotation of the pump shaft relative to the pump housing; and
   a seal associated with the pump shaft and the pump housing, such that the pump chamber is substantially sealed from the pump bearing, wherein the seal comprises:
     a seal housing received in the pump housing;
     a seal assembly received in the seal housing;
     a seal holder receiving at least a portion of the seal assembly, the seal holder being configured to rotate with respect to the seal housing; and
     a guide coupled to the seal housing and retaining the seal holder, such that the seal holder rotates with respect to the seal housing,
   wherein during operation of the pump, the seal holder and at least a portion of the seal assembly rotate, and
   wherein the guide, the seal holder, the seal assembly, and the seal housing are configured to be removable from the pump without uncoupling the seal housing from the pump housing.

7. The pump of claim 6, wherein the guide is coupled to the seal housing via at least one of:
   a press-fit;
   engagement of a threaded portion of the guide with a threaded portion of the seal housing; and
   threaded fasteners.

8. A seal for a pump, the seal comprising:
   a seal housing configured to be received in a housing of the pump;
   a seal assembly received in the seal housing;
   a seal holder receiving at least a portion of the seal assembly, the seal holder being configured to rotate with respect to the seal housing; and
   a guide coupled to the seal housing and retaining the seal holder, such that the seal holder rotates with respect to the seal housing,
   wherein during operation of the pump, the seal holder and at least a portion of the seal assembly rotate, and
   wherein the guide, the seal holder, the seal assembly, and the seal housing are configured to be removable from the pump without uncoupling the seal housing from the housing of the pump.

9. The seal of claim 8, wherein the guide is coupled to the seal housing via a press-fit.

10. The seal of claim 8, wherein the guide comprises a threaded portion and the seal housing comprises a threaded portion, and wherein the guide is coupled to the housing via engagement of the threaded portion of the guide with the threaded portion of the seal housing.

11. The seal of claim 8, wherein the guide is coupled to the seal housing via threaded fasteners.

12. The seal of claim 8, wherein the seal assembly comprises a rotating seal and a stationary seal, and wherein the rotating seal and the stationary seal comprise a rotating face seal and a stationary face seal, respectively.

13. The seal of claim 12, wherein the guide retains the seal holder and the seal assembly in the housing.

14. The seal of claim 12, wherein the rotating seal is adjacent the seal holder, and the stationary seal is opposite the seal holder with respect to the rotating seal.

15. A seal for a pump, the seal comprising:
a seal housing configured to be received in a housing of the pump;
a seal assembly received in the seal housing;
a seal holder receiving at least a portion of the seal assembly, the seal holder being configured to rotate with respect to the seal housing; and
a guide coupled to the seal housing and retaining the seal holder, such that the seal holder rotates with respect to the seal housing,
wherein during operation of the pump, the seal holder and at least a portion of the seal assembly rotate, and
wherein the seal assembly further comprises a rotating o-ring and a stationary o-ring.

16. A seal for a pump, the seal comprising:
a seal housing configured to be received in a housing of the pump;
a seal assembly received in the seal housing;
a seal holder receiving at least a portion of the seal assembly, the seal holder being configured to rotate with respect to the seal housing; and
a guide coupled to the seal housing and retaining the seal holder, such that the seal holder rotates with respect to the seal housing,
wherein during operation of the pump, the seal holder and at least a portion of the seal assembly rotate,
wherein the seal assembly further comprises a seal spacer, wherein the rotating seal and the stationary seal are positioned around the seal spacer, and
wherein the seal holder abuts an axial end of the seal spacer such that the seal holder constrains the seal spacer in the axial direction, and the seal spacer rotates with the seal holder and the rotating seal.

* * * * *

UNITED STATES PATENT AND TRADEMARK OFFICE
CERTIFICATE OF CORRECTION

| | | |
|---|---|---|
| PATENT NO. | : 9,341,175 B2 | |
| APPLICATION NO. | : 13/817878 | |
| DATED | : May 17, 2016 | |
| INVENTOR(S) | : Rolando Nico M. Ramos | |

It is certified that error appears in the above-identified patent and that said Letters Patent is hereby corrected as shown below:

In the Claims

Claim 4, Col. 7, Line 63, "0-ring" should read as --o-ring--.

Signed and Sealed this
Sixteenth Day of August, 2016

Michelle K. Lee
*Director of the United States Patent and Trademark Office*